United States Patent Office 3,017,404
Patented Jan. 16, 1962

3,017,404
TREATED LIGNIN PRODUCT AND THE MANUFACTURE THEREOF
Frank J. Ball, Charleston, S.C., assignor to West Virginia Pulp and Paper Company, New York, N.Y., a corporation of Delaware
No Drawing. Filed Oct. 20, 1959, Ser. No. 847,657
13 Claims. (Cl. 260—124)

This invention relates to lignin and relates more particularly to products produced by the treatment of lignin and to the method of producing such products.

In obtaining free cellulose fiber from natural ligno-cellulose material, the ligno-cellulose material ordinarily is subjected to treatment whereby the lignin content is solubilized sufficiently to permit the formation of an aqueous slurry from which the fibers may be separated. The dissolved lignin, which is in the neighborhood of 25% of the natural ligno-cellulose, is contained in the solution from which the fibers are separated.

Lignin as it occurs in natural ligno-cellulose material is a complex substance in the nature of a non-uniform polymeric structure in which the basic molecular configuration is believed to be derived from coniferyl-type alcohols with the creation of repeating propyl phenol units. The exact structure of lignin, however, is uncertain. A vast amount of research has been accomplished to determine the structure, but to date no structure has yet been set forth which satisfactorily explains all of the chemical and physical characteristics exhibited by lignin.

The lignin as it occurs in nature is generally termed "proto-lignin" and varies somewhat depending on the particular source of ligno-cellulose material. The principal variation in lignin, depending on its source, appears to be the number of methoxy groups present in the molecule. Thus it has been estimated that hardwood lignin contains about 20% to 21% by weight of methoxy groups, that lignin from softwoods contains about 14% to 15% of methoxy groups and that lignin from grasses contains only about 0 to 1% of methoxy groups. However, the methoxy groups contained in lignin are substantially non-reactive and in most instances the utility and fields of use are not substantially affected by the methoxy group content. When the proto-lignin content in naturally occurring ligno-cellulose material is separated from the cellulose fiber and later is recovered, the naturally occurring proto-lignin is affected by the recovery process, with the result that the lignin, which is ordinarily referred to in the art when this term is used, is the recovered lignin rather than the proto-lignin occurring in the natural ligno-cellulose material. In connection with this invention, it is the recovered lignin which is referred to when the term "lignin" is used.

There are different expedients for solubilizing the naturally occurring ligno-cellulose material so that free cellulose fiber may be recovered therefrom. This invention is, however, primarily concerned with "alkali lignin," as this term is used in the art, namely, lignin which is produced as a by-product of alkaline pulping using either the soda process wherein the pulping liquor contains sodium hydroxide or the sulfate process wherein the pulping liquor contains both sodium hydroxide and sodium sulfide. During either of these pulping processes the lignin is dissolved in the pulping liquor, which is usually referred to as "black" liquor, as a salt of lignin and the lignin is conventionally recovered from the pulping liquor by acid precipitation using an acid such as sulfuric or carbonic. The lignin can be recovered from acid precipitation as free lignin or as a lignin salt depending upon the specific conditions under which the lignin is obtained. If the lignin is precipitated at a high pH, generally about 9.5 to 10.0, the salt of lignin is obtained, while if the lignin is precipitated at a low pH, generally about 2.0 to 5.0, or if the lignin precipitated at a high pH is acid-washed so as to substantially free the lignin from its salts, free lignin is obtained. An alkali metal salt of lignin, such as the sodium, potassium or lithium salt, or the ammonium salt of lignin, is soluble in water, whereas free lignin, which also may be referred to as "free acid lignin," is insoluble in water.

This invention is primarily concerned with the production of improved lignin products by the treatment of free alkali lignin. It is not essential that the free lignin be completely free of alkali metal salt so long as the alkali lignin is substantialy insoluble in water. While this invention is ordinarily practiced by the treatment of free ligning, it also may be practiced by the treatment of a water insoluble salt of lignin such as the salts of calcium, lead, iron, barium, aluminum, copper, cobalt or magnesium. Accordingly, this invention in its broadest aspects is concerned with the treatment of water insoluble lignin.

In the recovery of lignin from black liquor, the initial product of acid precipitation is separated from residual solution so that the large amount of water contained in the black liquor as initially produced may be removed. The lignin so precipitated ordinarily is put back into solution and reprecipitated with acid so as to separate additional ash-forming ingredients from the lignin precipitate. This free acid lignin precipitate then is concentrated to form a cake containing about 40% to 60% of water. The lignin may then be recovered by drying. The drying expedient that is conventionally employed is that of forming a slurry of such consistency as to be spray dried, the water content usually being such that the dry lignin constitutes about 25% to 40% by dry weight of the slurry. Conventional spray drying equipment may be employed whereby the lignin slurry is caused to be projected in the form of a multiplicity of minute droplets into a drying atmosphere, which normally is air which has been heated to a temperature of the order of about 700° F. to 800° F. The heated atmosphere into which the minute droplets are projected is continuously moved through the spraying chamber so that the water vapor from the moist particles may be continuously removed. The coarser lignin particles are collected in the spraying chamber while a considerable amount of the dried lignin is carried from the spraying chamber by the moving stream of drying gases. For the purpose of recovering additional lignin, the drying gases after leaving the spraying chamber may be passed through a separator of the cyclone type. However, a substantial portion of the lignin is of such fine particle size that when the drying gases are exhausted into the atmosphere these particles, because of their extreme fineness, are carried therewith, and to the extent that such losses occur, which are usually referred to as "stack losses," there is a corresponding lowering of the percentage of lignin recovered in the spray drying operation.

In addition to spray drying, other expedients are possible such as drying the lignin as initially produced in the form of a moist cake distributed on either stationary or moving pans or screens.

When lignin is recovered in the form of free lignin from the black liquor by the expedient of either repeated acid precipitation or acid washing of precipitated salt of lignin, or by collecting only lignin precipitated at a very low pH, the particulate nature of the lignin is essentially that determined by precipitation from solution, the particulate entities being very small although a certain amount of agglomeration occurs. Thus typically the lignin particles as precipitated may range in size from about 0.5 to 10 microns. It is possible to produce even smaller lignin particles. On the other hand, by controlled agglomeration of the tiny particles entities may be built up to about 50 microns in maximum dimension. However, it also is the case that the recovered lignin particles are of a weak, frangible nature so that even though a certain amount of agglomeration may initially occur the agglomerates tend to break down into extremely fine particles.

The minuteness of the particle size of recovered free lignin as well as the frangibility of aggregates of such particles presents difficulties both in the recovery of the lignin and its commercial use. The principal difficulty in this regard is that of the extreme dustiness of free lignin recovered in dry condition. For handling lignin in a commercial operation wherein free lignin is used, the dustiness of the lignin presents serious problems. Thus the dust presents a nuisance to workmen. Moreover, many of the particles are so fine as to flow long distances in the air and in operations such as the production of laminates having a decorative surface any soiling resulting from lignin dust contamination presents a serious problem.

Another drawback results from the fact that in the recovery process itself a very substantial amount of lignin is lost during spray drying by reason of the stack losses hereinabove mentioned. Such stack losses may run as high as 25% of the initially produced lignin precipitate.

Another troublesome property of free lignin recovered in dry form is that it is difficult to dissolve the lignin in lignin solvents. While free lignin is insoluble in water, nevertheless there are a number of organic solvents for free lignin. Thus when free lignin is used as an extender for a phenol-aldehyde type resin, the solvent medium for the uncured resin component, such as methanol or aqueous ethanol, also is a solvent for the free lignin. However, if attempt is made to dissolve free lignin in such an alcoholic medium containing an uncured or incompletely cured phenol-aldehyde type resin, the lignin goes into the solution in an irregular fashion and it frequently requires up to several hours to get rid of some of the clumps or blobs of undissolved lignin particles. In such case, the partial solution of some of the lignin particles as initially effected appears to interfere with the wetting of associated lignin particles with the solvent medium.

It is an object of this invention to provide free alkali lignin or other insoluble alkali lignin in a modified form whereby the problem of dustiness during handling has been minimized.

A further object of this invention is to provide a spray drying recovery process whereby stack losses are minimized.

Further objects of this invention relate to the production of free alkali lignin or other water insoluble lignin in a form which is readily dispersible in liquids, as, for example, dispersion in a solvent medium to obtain a solution or dispersion in a non-solvent medium to produce a uniform slurry.

Other objects and features of this invention relate to the modification of other properties of the recovered lignin as regards both physical and chemical characteristics.

According to this invention, water insoluble alkali lignin, and more especially free lignin, is produced in the form of discrete particles, characterized by an exterior crust of fused lignin. The particles are free flowing and notable for freedom from dustiness when being handled. Moreover, the crust of fused lignin is of such strength that the particles are resistant to becoming broken down to smaller particles.

From the method point of view, the improved lignin product is produced by the drying of an aqueous material containing the water insoluble lignin particles, the aqueous mass containing a small quantity of a water soluble substance which is a dissolving agent for the lignin. The dissolving agent for the lignin may function either to cause a portion of the lignin to become dissolved in the aqueous medium or to itself go into mutual solution with the lignin. Moreover, both of these phenomena simultaneously may take place.

In the production of the improved lignin product of this invention the water insoluble alkali lignin that is dispersed in an aqueous medium is dried under such conditions that there is a migration of a dissolved substance to a surface from which water vapor is escaping, which migration results in the lignin becoming solubilized to such an extent that the lignin at and adjacent the exposed surface becomes fused with the development of a coherent crust during the final stages of drying.

The phenomena that take place are well illustrated in connection with the spray drying of an aqueous slurry of free lignin. By incorporating in such aqueous slurry a small amount of free lignin which has been brought into solution by conversion to the lignin ammonium salt, a composition is provided comprising the undissolved free lignin particles and lignin ammonium salt in solution. Upon subjecting the slurry to spray drying, the droplets which are projected into the drying atmosphere consist of moist agglomerates of small lignin particles. While these particles are exposed to the drying atmosphere, the moisture content thereof migrates to the surface and the dissolved lignin ammonium salt remains. As the drying progresses further, most of the ammonia is driven off with regeneration of lignin in water insoluble form at the particle surfaces. The lignin thus regenerated is in the form of a coherent crust of the kind hereinabove referred to.

Instead of employing a dissolving agent which causes the lignin to go into solution in the aqueous medium, this invention may likewise be practiced by the utilization of a dissolving agent such as diethylene glycol. In such case, the diethylene glycol is soluble in the aqueous medium and during the drying of the droplets of lignin slurry the diethylene glycol migrates to the surface of the particles and, as it does so, the lignin and the diethylene glycol go into a mutual solution in the presence of the moisture whereby the lignin at the surface of the particles becomes fused to form a crust of the kind hereinabove mentioned.

The resulting product which is produced by reason of the phenomena above mentioned is of a distinctly different character as compared with ordinary free alkali lignin produced by acid precipitation from black liquor and spray drying. Thus the particles, on the average, are of substantially greater size and are likewise characterized by the exterior crust of fused lignin. The fused nature of the lignin that is comprised in the crust usually is apparent by the darker appearance of a mass of the lignin particles as compared with ordinary free lignin, which has the appearance of a tan or light brown powder. When viewed under the microscope, the existence of the crust is readily apparent and frequently pieces of the crust are observable having the appearance of portions of a spheroidal shell. There may be considerable variation as between different particles produced in a single run of the improved lignin product of this invention. Thus a substantial number of particles have been observed wherein the lignin underlying the crust is in the form of a microporous foam. Likewise, many particles are observable which have the appearance of hollow spheres, the particles, in such case, consisting essentially entirely of the fused crust. In other instances bunches of lignin particles are associated together with an irregular exterior crust of fused lignin.

In the case of free lignin produced by the spray drying of an aqueous slurry of free lignin containing a small amount of dissolved lignin ammonium salt, the lignin product consists essentially entirely of free lignin inasmuch as the ammonia used for solubilizing a portion of the lignin becomes driven off during spray drying, leaving only about 0.1% to 0.5% of nitrogen in the lignin product. Whenever a dissolving agent such as diethylene glycol is employed, the dissolving agent being relatively non-volatile remains and is comprised in the lignin crust. The amount of dissolving agent which may thus be caused to be present in the lignin particles may vary from a very small amount such as 0.1% or 0.2% by weight of the dry particles to quite substantial amounts such as 25%, or even 50%, by weight of the lignin particles. While such solvents may be present, it is to be understood that when reference is made to a fused crust of lignin the crust may be substantially free of any substance other than lignin or may comprise a substantial amount of the dissolving agent that is used.

The dissolving agents employed in very low quantities, e.g. at quantities equal to 0.1% of the weight of the lignin, will generally be those which cause solubilization of the lignin in the water. These water solubilizing agents, such as ammonia, alkali metal hydroxides and certain amines, are needed only in very small quantities as they cause dissolution of a relatively large amount of lignin which, during the drying process, forms the fused crust on the free lignin particles. For example, if ammonia is added to a free lignin slurry at 180° F. in a quantity as little as 0.1% of the weight of the lignin, approximately 4% of the lignin will become dissolved in the water. This amount of dissolved lignin is sufficient to form a fused crust on the majority of the free lignin particles. At lower temperatures, a greater quantity of ammonia will, of course, be required to solubilize an equivalent quantity of the lignin.

Dissolving agents which are employed in large quantities, e.g., 50% of the weight of the lignin, will generally be of the type which goes into solution with the lignin when some or all of the water has been evaporated. The water solubilizing agents cannot usually be employed at these high quantities as they would cause complete dissolution of the entire quantity of the lignin. This would result in a product wholly unlike the product of this invention in that it would not comprise a core of free lignin enclosed in a crust of fused lignin. In general, with the use of water solubilizing agents it is not desirable to cause solubilization of more than approximately 50% of the free lignin.

When a substantial amount of dissolving agent is present in the crust of fused lignin, its presence modifies the physical and chemical characteristics of the lignin product. Modified properties in such respects as solubility, fusibility and chemical reactivity may be accomplished in this way depending upon the selection and amount of the dissolving agent that is used.

The practice of this invention in preferred form may be exemplified utilizing ammonia as the dissolving agent in a spray drying operation. To 1,900 lbs. of free lignin in the form of a 40% solids cake, sufficient water was added to produce a slurry containing 3.37 lbs. of lignin per gal., the free lignin employed being that conventionally produced in the form of a dusty brown powder. 100 lbs. of the same lignin were mixed separately with sufficient water to produce a slurry also containing 3.37 lbs. of dry lignin per gal. To the second slurry, 42.8 gals. of 28.2% by weight aqueous ammonia were added with resultant solubilization of the lignin in the slurry occasioned by its conversion to the soluble ammonium salt form. The solution of lignin ammonium salt was then added to the 564 gals. of slurry of undissolved free lignin. The resultant mixture was fed to a spray drier, where the mixture was atomized using a high-speed centrifugal disc. The atomized particles of this mixture were contacted with gases having an inlet temperature between 700° F. and 800° F. with resultant evaporation of the water and a large proportion of the ammonia content in the slurry. 1,204 lbs. of dry lignin were recovered from the spray drying chamber and 583 lbs. of dry lignin were removed by a cyclone type separator from the gas stream leaving the spray drying chamber. Thus the total quantity of dry lignin recovered was 1,787 lbs., this being 89.4% of the total weight of the lignin fed to the spray drier.

The product recovered from the operation above described was of the general character mentioned hereinabove. Most of the particles recovered from the spraying chamber were retained on a standard 140-mesh sieve. The particles recovered from the cyclone separator were somewhat smaller in size, most of them passing a 200-mesh sieve. The number of particles recovered in the spray drying chamber having a microporous interior surrounded by the lignin crust was greater than the number of such particles recovered from the cyclone separator. On the other hand, the number of particles recovered in the form of substantially hollow spheres was greater in the case of the material recovered from the cyclone separator as compared with the material recovered from the spraying chamber.

The dustiness of a lignin product recovered in dry form may be evaluated by placing the product in a closed glass container of substantially 1-qt. capacity so as to fill the container approximately half full. If the glass container is inverted quickly, the dustiness of the lignin is evaluated by measuring the time required for the lignin dust in the atmosphere in the container above the level of the lignin solids to settle. In the case of free alkali lignin as conventionally recovered, the aforesaid test results in a cloud of dust which remains suspended in very substantial amount for thirty minutes and even much longer for certain portions of the lignin dust that become suspended. By contrast, when the lignin product is produced as hereinabove exemplified, the product is substantially free of dust-forming particles. In the case of particles recovered from the drying chamber, no appreciable dust whatever is observable when the material is subjected to the aforesaid test. In the case of the material recovered from the cyclone separator, there is only a slight trace of dustiness when the material is subjected to the test for dustiness and the atmosphere above the product becomes substantially clear in a matter of only a second or two. Similar characteristics are exhibited when the lignin recovered from the drying chamber and the lignin recovered from the cyclone separator are commingled together.

It is also an advantageous feature of the lignin product produced that if after having placed the lignin product in the glass container the glass container is repeatedly shaken, the strength of the crusts and the lignin particles is such as to prevent the particles from crumbling into smaller dust-producing particles in any very substantial amount. This is in contrast with the larger agglomerates of free lignin which may be prepared by controlled acid precipitation, for in such case the particles are of such a crumbly, friable nature that dustiness results from any such agitation.

The stack losses of lignin during the spray drying operation in the foregoing example were reduced to 10.6%. These losses may be reduced even further to well under 10%. This is in contrast with stack losses of 20% or more which are ordinarily encountered in commercial operations for the production of spray-dried free alkali lignin.

The improved solubility of the lignin product produced as hereinabove exemplified was demonstrated by dissolution in a phenol-aldehyde type resin dissolved in aqueous methanol. The resole solution employed for the test was a commercial resole sold by The Bakelite Co., Inc., under the trade designation BRL-1100. This resole is an A stage resole and it contained 71% solids. 25 grams of methanol were added to 150 grams of the resole solution. 25 grams of the lignin product produced as exemplified above were then sprinkled on top of the resole solution over a period of 30 seconds. At the end of this time agitation was begun and the new lignin product became dispersed virtually simultaneously with the commencement of agitation so as to go into solution in only one or two seconds. No lumps were formed and any residual small particles went into complete solution after about 3 minutes of agitation. As contrasted with the foregoing, when attempt was made under like conditions to dissolve free alkali lignin as conventionally recovered, the results were very much different. Thus the free lignin powder remained on the surface of the solution for about 10 seconds before even starting to become dispersed in the solution. Moreover, there was difficulty in wetting the powder and a substantial amount of the powder remained undispersed until after the agitation had continued for about 2 minutes. Moreover, a substantial amount of the powder remained in the form of lumps about the size of peas, which still remained after 30 minutes of constant agitation. Such difficulties in incorporation of a dry powdered lignin product present a very serious commercial drawback and it is apparent that such difficulties have been completely overcome in the case of the improved new lignin product of this invention.

When employing a dissolving agent such as diethylene glycol, it may merely be added to the slurry of free lignin prior to drying the lignin. For example, 260 lbs. of diethylene glycol were added to 2,000 gals. of a 35% slurry of free lignin containing 6,500 lbs. of free lignin (3.25 lbs. lignin per gal.). After mixing, the resultant mixture was spray dried as described hereinabove. 3,300 lbs. were collected in the spraying chamber and 1,395 lbs. in the cyclone separator, the percentage recovery being 89.8%. The product of this example had substantially the same characteristics as those described above in connection with the preceding example as regards physical form. However, its capacity to go into solution was even greater. Moreover, for solutions of a given concentration the viscosity is somewhat less and the temperature at which the product fuses is considerably lower. It is believed that in the case of diethylene glycol it not only acts to dissolve some of the lignin as it migrates to the surface of lignin particles during drying, but also reacts with a portion of the lignin by esterification of a carboxyl contained in the lignin.

In addition to or in lieu of the ammonium salt, a portion of the alkali lignin comprised in the slurry may be in the form of an alkali metal salt but with some increase as regards the ash content in the final product. However, the increase in ash content may be very slight. For example, if 10% of the alkali lignin is in the form of alkali lignin sodium salt having an ash content of 5%, the ash content of the final product resulting from the employment of the sodium salt is only 0.5%. A product such as this may be desirable when it is desired to avoid a smell of ammonia.

In addition to the foregoing, other dissolving agents for free alkali lignin may be employed and by the selection of the dissolving agent employed certain of the properties of the lignin product may be varied. Such variations in the properties of the product are especially pronounced in the case of dissolving agents that are reactive with the lignin. Thus the glycols, glycol ethers, aldehydes, phenols and amines, for example, as a rule are reactive to a certain extent with the alkali lignin.

Among the water soluble glycols and glycol ethers that are solvents for alkali lignin are butyl carbitol, butyl carbitol acetate, butyl cellosolve (ethylene glycol monobutyl ether), carbitol (diethylene glycol monoethyl ether), polypropylene glycols up to a molecular weight of about 1,000, cellosolve acetate, dimethoxy tetraglycol, dipropylene glycol methyl ether, ethylene glycol, methyl carbitol (diethylene glycol monomethyl ether), methyl cellosolve (ethylene glycol monomethyl ether), methyl cellosolve acetate, phenyl cellosolve, propylene glycol, propylene glycol methyl ether, triethylene glycol, and tripropylene glycol methyl ether.

Various aldehydes may be employed such as acetaldehyde, benzaldehyde and paraformaldehyde. Phenols may be used such as phenol, cresol and thymol.

Instead of ammonia, various amines may be employed such as aminoethylethanolamine, 2-amino-2-methyl-1-propanol, aniline, butylamine, diethanolamine, diethylene triamine, di-2-ethylhexylethanolamine, di-2-ethylhexylamine, dimethylaniline, dimethylethanolamine, ethylenediamine (69.3%), ethyleneimine, methyl diethanolamine, monoethanolamine, monoethylaminotriethylamine, phenylethanolamine, o-toluidine, triethanolamine, triethylamine, triethylene tetramine, and hexamethylene tetramine. Amines serve both to form a soluble salt of free alkali lignin and as a solvent therefor.

Alcohols such as allyl, ethyl, methyl and tetradecanol may also be used as solvents. Similarly ketones may be employed such as diacetone alcohol, isophorone, mesityl oxide, methyl ethyl ketone, and pentanedione. Esters such as diethyl sulfate, ethyl oxalate and triethyl phosphate may be used as well as heterocyclic compounds such as dimethyl dioxane, dimethyl furane, 1,4-dioxane, dioxolane, furfuryl alcohol, methyl morpholine, morpholine, propylene oxide, tetrahydrofurfuryl alcohol, tetrahydropyrane, and thialdine.

Other water soluble organic solvents for free alkali lignin are acetic acid, formic acid, lactic acid, monochloroacetic acid, lutidine-2,4, lutidine-2,6, alpha-picoline, beta-picoline, gamma-picoline, pyridine, piperidine, quinoline, acrylonitrile, 2-nitro-2-ethyl-1,3-propanediol (melted), 2-nitro-2-methyl-1-propanol (melted), dimethyl sulfolane, dimethyl sulfoxide, formamide, glycerol, and sodium xylene sulfonate.

In addition to the foregoing, any of the water soluble or water dispersible resoles may be employed as well as dimethylol urea.

The dissolving agent that is employed may be such as to dissolve some lignins in the slurry of free alkali lignin as initially prepared, e.g., ammonia, or the dissolving agent may become effective during the latter stages of drying when some or all of the water has been evaporated. In either case the dissolving agent may be of the volatile or non-volatile type. In the case of ammonia nearly all the ammonia is lost, while in the case of sodium hydroxide none of the agent is lost. In the case of a glycol such as diethylene glycol, nearly all of the glycol is retained. When using a solvent such as phenol or cresol, some is lost during drying, but a substantial portion is retained.

Some organic solvents such as diethylene glycol or polypropylene glycol exercise a plasticizing effect and tend to enhance solubility of the product. Certain solvents which react with the lignin such as trimethylol phenol tend to decrease the solubility of the product. Other effects on solubility result from the amount of dissolving agent that is present. Thus in the case of ammonia, the quantity of ammonia that is retained affects the relative solubility of the product in methanol and ethanol.

The viscosity of solutions prepared from the lignin product may be varied by the selection of the dissolving agent. Thus diethylene glycol results in a product notable for forming low viscosity solutions with solvents such as methanol or aqueous ethanol. On the other hand, by the employment of a water soluble resole such as di- or tri-methylol phenol the resulting product results in high viscosity solutions; this being desirable, for example, in applications such as plywood manufacture where it is advantageous to minimize penetration into the wood.

While it constitutes normal and very much preferred practice of this invention to spray dry the slurry of free alkali lignin, the drying may be effected in other ways so long as small particles of the slurry are dried in such a manner to permit the migration of the dissolving agent to the surface of the particle.

The slurry that is dried preferably contains the minimum of volatile constituent to be removed consistent with the over-all method of production. Thus for spray drying, it is preferable that the aqueous medium constitute from about 10% to 35% by weight of the slurry. Greater dilution merely increases the amount of volatile material that has to be carried off.

While this invention has been described in connection with the spray drying of alkali lignin, the principles disclosed and availed of as set forth hereinabove may be applied in the case of other types of lignin such as lignin recovered from acid hydrolysis pulping or insoluble salts of sulfite lignin.

While this invention has been described in connection with various examples and specific ways of practicing the invention, it is to be understood that this has been done for the purposes of illustration and that the practice of this invention may be varied within the scope of the principles employed in the practice thereof as hereinabove set forth.

I claim:
1. A method for the production of lignin in particulate form which comprises introducing into a drying atmosphere in discrete form small particles of an aqueous slurry of water-insoluble lignin containing a dissolving agent for said lignin, and drying said particles while surrounded by said atmosphere, at least approximately 50% by dry weight of the lignin in said slurry being undissolved, and a substantial portion of said lignin being dissolved by said dissolving agent and becoming fused at the particle surfaces during drying to form a surface crust.

2. A method for the production of lignin in particulate form which comprises spray-drying particles of an aqueous slurry of free alkali lignin containing a dissolving agent for said lignin, at least approximately 50% by dry weight of the lignin in said slurry being undissolved and a substantial portion of said lignin being dissolved by said dissolving agent and becoming fused at the particle surfaces during drying to form a surface crust.

3. A method for the production of lignin in particulate form which comprises introducing into a drying atmosphere in discrete form small particles of an aqueous slurry of free alkali lignin containing a substantial amount of a soluble salt of alkali lignin dissolved in the aqueous medium, and drying said particles while surrounded by said atmosphere, at least approximately 50% by dry weight of the lignin in said slurry being said particles of undissolved free alkali lignin, and said dissolved salt of alkali lignin during the drying of said particles becoming fused at the particle surfaces to form a surface crust.

4. A method for the production of lignin in particulate form which comprises spray-drying particles of an aqueous slurry of free lignin containing the ammonium salt of alkali lignin dissolved in the aqueous medium, at least approximately 50% by dry weight of the lignin in said slurry being said particles of undissolved free alkali lignin, a substantial portion of the ammonia contained in said ammonium salt being volatilized and separated from said particles during drying and said dissolved lignin ammonium salt during said drying becoming fused at the particle surfaces to form a surface crust.

5. A method for the production of lignin in particulate form which comprises introducing into a drying atmosphere in discrete form small particles of an aqueous slurry of free alkali lignin containing dispersed in the aqueous medium a solvent for said lignin that is retained in substantial amount during drying, and drying said particles while surrounded by said atmosphere, at least approximately 50% by dry weight of the lignin in said slurry being undissolved and a substantial portion of said lignin being dissolved in said retained solvent and during drying becoming fused at the particle surfaces to form a surface crust.

6. A method for the production of lignin in particulate form which comprises spray-drying particles of an aqueous slurry of free alkali lignin containing dispersed in the aqueous medium a water-soluble organic solvent for said lignin that is retained in substantial amount during drying, at least approximately 50% by dry weight of the lignin in said slurry being undissolved and a substantial portion of said lignin being dissolved in said retained solvent and during drying becoming fused at the particle surfaces to form a surface crust.

7. A method according to claim 6 wherein said soluble organic solvent chemically reacts with the fused lignin in said crust at the particle surfaces.

8. A lignin product in the form of discrete water-insoluble solid particles, said particles having a fused surface crust and being the product produced by the method of claim 1.

9. A lignin product in the form of discrete water-insoluble solid particles wherein the lignin consists essentially of free alkali lignin, said particles having a fused surface crust containing a dissolving agent for said lignin in an amount that is not more than about 50% by weight of said particles and that is insufficient to render said particles water-soluble and being the product produced according to claim 2.

10. A lignin product in the form of discrete water-insoluble solid particles wherein the ligning consists essentially of free alkali lignin, said particles having a fused surface crust containing a water-soluble salt of alkali lignin in insufficient amount to render said particles water-soluble, and being the product produced by the method of claim 3.

11. A lignin product in the form of discrete water-insoluble solid particles at least about 99.5% by dry weight of which consist of free alkali lignin and which are the product produced by the method of claim 4.

12. A lignin product in the form of discrete water-insoluble solid particles wherein the lignin consists essentially of free alkali lignin, said particles having a fused surface crust containing an organic solvent for said lignin in an amount that is not more than about 50% by weight of said particles and that is insufficient to render said particles water-soluble and being the product produced according to claim 6.

13. A lignin product according to claim 12 wherein the lignin in said coating is substantially modified by chemical reaction with said organic solvent.

References Cited in the file of this patent
FOREIGN PATENTS
466,610    Canada _____ July 18, 1950